US008750217B2

(12) United States Patent
Lee et al.

(10) Patent No.: US 8,750,217 B2
(45) Date of Patent: Jun. 10, 2014

(54) METHOD FOR SCHEDULING RADIO RESOURCES IN MOBILE COMMUNICATION SYSTEM

(75) Inventors: Young Dae Lee, Gyeonggi-do (KR); Sung Duck Chun, Gyeonggi-do (KR); Myung Cheul Jung, Seoul (KR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 434 days.

(21) Appl. No.: 12/159,981

(22) PCT Filed: Jan. 4, 2007

(86) PCT No.: PCT/KR2007/000051
§ 371 (c)(1),
(2), (4) Date: Oct. 28, 2008

(87) PCT Pub. No.: WO2007/078155
PCT Pub. Date: Jul. 12, 2007

(65) Prior Publication Data
US 2009/0219868 A1 Sep. 3, 2009

Related U.S. Application Data

(60) Provisional application No. 60/757,063, filed on Jan. 5, 2006, provisional application No. 60/815,722, filed on Jun. 21, 2006.

(30) Foreign Application Priority Data

Nov. 1, 2006 (KR) ........................ 10-2006-0107104

(51) Int. Cl.
*H04W 4/00* (2009.01)
*H04L 12/28* (2006.01)

(52) U.S. Cl.
USPC ...................................... 370/329; 370/395.4

(58) Field of Classification Search
USPC ................. 370/229, 235, 236, 328, 329, 331, 370/395.4; 455/422.1, 432.1, 436, 437, 455/438, 439, 450; 709/223, 226
See application file for complete search history.

(56) References Cited

U.S. PATENT DOCUMENTS 5,659,756 A 8/1997 Hefferon et al.
5,828,677 A 10/1998 Sayeed et al.
(Continued)

FOREIGN PATENT DOCUMENTS

CN 1315121 9/2001
CN 1411668 4/2003
(Continued)

OTHER PUBLICATIONS

Haardt, M., et al., "The TD-CDMA Based UTRA TDD Mode," IEEE Journal on Selected Areas in Communications, vol. 18, No. 8, pp. 1375-1385, Aug. 2000.

(Continued)

*Primary Examiner* — Michael Thier
*Assistant Examiner* — Feben M Haile
(74) *Attorney, Agent, or Firm* — Lee, Hong, Degerman, Kang & Waimey

(57) ABSTRACT

A method for scheduling radio resources in a mobile communication system is disclosed. The method includes allocating radio resources to a specific User Equipment (UE), receiving a release request message of the allocated radio resources from the specific UE and re-allocating unused radio resources to other UEs other than the specific UE. The method according to the present invention can re-allocate unused radio resources to other UEs using a control signal received from a specific UE such that wasted radio resources are minimized and efficiency of data communication in a mobile communication system may be enhanced.

4 Claims, 6 Drawing Sheets

(56) References Cited

U.S. PATENT DOCUMENTS

| | | |
|---|---|---|
| 6,088,342 A | 7/2000 | Cheng et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,421,540 B1 | 7/2002 | Gilhousen et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,795,412 B1 | 9/2004 | Lee |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,031,708 B2 | 4/2006 | Sarkkinen et al. |
| 7,054,289 B1 * | 5/2006 | Foster et al. ............... 370/330 |
| 7,075,971 B2 | 7/2006 | Parsa et al. |
| 7,145,895 B2 | 12/2006 | Mueckenheim et al. |
| 7,151,758 B2 * | 12/2006 | Kumaki et al. ............. 370/331 |
| RE39,454 E | 1/2007 | Cantoni et al. |
| 7,184,792 B2 | 2/2007 | Mir |
| 7,239,870 B2 | 7/2007 | Zhang et al. |
| 7,359,345 B2 | 4/2008 | Chang et al. |
| 7,359,349 B2 * | 4/2008 | Kayama et al. ............. 370/329 |
| 7,426,175 B2 | 9/2008 | Zhuang et al. |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,673,211 B2 | 3/2010 | Meyer et al. |
| 7,778,599 B2 | 8/2010 | Li et al. |
| 7,826,855 B2 | 11/2010 | Chun et al. |
| 7,826,859 B2 | 11/2010 | Lee et al. |
| 7,839,829 B2 | 11/2010 | Lee et al. |
| 7,843,877 B2 | 11/2010 | Lee et al. |
| 7,848,308 B2 | 12/2010 | Lee et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 8,090,382 B2 | 1/2012 | Park et al. |
| 2001/0021197 A1 | 9/2001 | Foore et al. |
| 2001/0024956 A1 | 9/2001 | You et al. |
| 2001/0046864 A1 | 11/2001 | Bhatoolaul et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0071480 A1 | 6/2002 | Marjelund et al. |
| 2002/0090004 A1 | 7/2002 | Rinchiuso |
| 2002/0093940 A1 | 7/2002 | Toskala et al. |
| 2002/0116515 A1 | 8/2002 | Hashimoto |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0007510 A1 | 1/2003 | Yeo et al. |
| 2003/0016672 A1 | 1/2003 | Rosen et al. |
| 2003/0035440 A1 | 2/2003 | Casaccia et al. |
| 2003/0050097 A1 | 3/2003 | Amirijoo et al. |
| 2003/0076812 A1 | 4/2003 | Benedittis |
| 2003/0078046 A1 | 4/2003 | Seo |
| 2003/0084185 A1 | 5/2003 | Pinkerton |
| 2003/0087655 A1 | 5/2003 | Matsuoka |
| 2003/0103476 A1 | 6/2003 | Choi et al. |
| 2003/0139170 A1 | 7/2003 | Heo |
| 2003/0147371 A1 | 8/2003 | Choi et al. |
| 2003/0156624 A1 | 8/2003 | Koslar |
| 2003/0210669 A1 | 11/2003 | Vayanos et al. |
| 2003/0223393 A1 | 12/2003 | Lee |
| 2003/0236085 A1 | 12/2003 | Ho |
| 2004/0001452 A1 | 1/2004 | Day et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0014452 A1 | 1/2004 | Lim et al. |
| 2004/0028078 A1 | 2/2004 | Beckmann et al. |
| 2004/0077357 A1 | 4/2004 | Nakada |
| 2004/0103435 A1 | 5/2004 | Yi et al. |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0143676 A1 | 7/2004 | Baudry et al. |
| 2004/0146019 A1 | 7/2004 | Kim et al. |
| 2004/0147271 A1 | 7/2004 | Billon et al. |
| 2004/0157602 A1 | 8/2004 | Khawand |
| 2004/0180675 A1 | 9/2004 | Choi et al. |
| 2004/0184437 A1 | 9/2004 | Lee et al. |
| 2004/0185860 A1 | 9/2004 | Marjelund et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0041573 A1 | 2/2005 | Eom et al. |
| 2005/0059407 A1 | 3/2005 | Reed et al. |
| 2005/0073987 A1 | 4/2005 | Wu |
| 2005/0107036 A1 | 5/2005 | Song et al. |
| 2005/0111393 A1 | 5/2005 | Jeong et al. |
| 2005/0129058 A1 | 6/2005 | Casaccia et al. |
| 2005/0135416 A1 | 6/2005 | Ketchum et al. |
| 2005/0157696 A1 | 7/2005 | Yamamoto |
| 2005/0185608 A1 | 8/2005 | Lee et al. |
| 2005/0190728 A1 | 9/2005 | Han et al. |
| 2005/0195732 A1 | 9/2005 | Huh et al. |
| 2005/0207374 A1 | 9/2005 | Petrovic et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0260997 A1 | 11/2005 | Korale et al. |
| 2005/0271025 A1 | 12/2005 | Guethaus et al. |
| 2005/0277429 A1 | 12/2005 | Laroia et al. |
| 2005/0281212 A1 | 12/2005 | Jeong et al. |
| 2005/0288026 A1 | 12/2005 | Byun et al. |
| 2006/0011953 A1 | 1/2006 | Nakahashi et al. |
| 2006/0018289 A1 | 1/2006 | Schulist et al. |
| 2006/0025079 A1 | 2/2006 | Sutskover et al. |
| 2006/0030342 A1 | 2/2006 | Hwang et al. |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0083183 A1 | 4/2006 | Teague et al. |
| 2006/0120403 A1 | 6/2006 | Murata et al. |
| 2006/0143300 A1 | 6/2006 | See et al. |
| 2006/0146745 A1 | 7/2006 | Cai et al. |
| 2006/0154680 A1 | 7/2006 | Kroth et al. |
| 2006/0168343 A1 * | 7/2006 | Ma et al. ....................... 709/245 |
| 2006/0193282 A1 | 8/2006 | Ikawa et al. |
| 2006/0256818 A1 | 11/2006 | Shvodian et al. |
| 2006/0282739 A1 | 12/2006 | Meyer et al. |
| 2006/0292982 A1 | 12/2006 | Ye et al. |
| 2007/0060146 A1 | 3/2007 | Won et al. |

(56) References Cited

U.S. PATENT DOCUMENTS

| | | | |
|---|---|---|---|
| 2007/0081483 A1 | 4/2007 | Jang et al. | |
| 2007/0098006 A1 | 5/2007 | Parry et al. | |
| 2007/0104151 A1 | 5/2007 | Papasakellariou et al. | |
| 2007/0117579 A1 | 5/2007 | Cai et al. | |
| 2007/0121543 A1 | 5/2007 | Kuchibhotla et al. | |
| 2007/0133458 A1 | 6/2007 | Chandra et al. | |
| 2007/0135080 A1* | 6/2007 | Islam et al. | 455/343.1 |
| 2007/0140115 A1 | 6/2007 | Bienas et al. | |
| 2007/0143369 A1 | 6/2007 | Uppala | |
| 2007/0147326 A1 | 6/2007 | Chen | |
| 2007/0206531 A1 | 9/2007 | Pajukoski et al. | |
| 2007/0218930 A1 | 9/2007 | Kuo | |
| 2007/0254662 A1 | 11/2007 | Khan et al. | |
| 2007/0274253 A1 | 11/2007 | Zhang et al. | |
| 2008/0043619 A1 | 2/2008 | Sammour et al. | |
| 2008/0069031 A1 | 3/2008 | Zhang et al. | |
| 2008/0095105 A1 | 4/2008 | Sundberg et al. | |
| 2008/0130643 A1 | 6/2008 | Jain et al. | |
| 2008/0137564 A1 | 6/2008 | Herrmann | |
| 2008/0212541 A1 | 9/2008 | Vayanos et al. | |
| 2008/0232291 A1 | 9/2008 | Hus et al. | |
| 2008/0267136 A1 | 10/2008 | Baker et al. | |
| 2008/0298322 A1 | 12/2008 | Chun et al. | |
| 2008/0305819 A1 | 12/2008 | Chun et al. | |
| 2009/0005095 A1 | 1/2009 | Chun et al. | |
| 2009/0011718 A1 | 1/2009 | Chun et al. | |
| 2009/0011769 A1 | 1/2009 | Park et al. | |
| 2009/0016254 A1 | 1/2009 | Lee et al. | |
| 2009/0047912 A1 | 2/2009 | Lee et al. | |
| 2009/0052388 A1 | 2/2009 | Kim et al. | |
| 2009/0109912 A1 | 4/2009 | DiGirolamo et al. | |
| 2009/0129335 A1 | 5/2009 | Lee et al. | |
| 2009/0150739 A1 | 6/2009 | Park et al. | |
| 2009/0163211 A1 | 6/2009 | Kitazoe et al. | |
| 2009/0175241 A1 | 7/2009 | Ohta et al. | |
| 2009/0185477 A1 | 7/2009 | Lee et al. | |
| 2009/0201948 A1 | 8/2009 | Patwardhan et al. | |
| 2009/0238141 A1 | 9/2009 | Damnjanovic et al. | |
| 2009/0319850 A1 | 12/2009 | Baek et al. | |
| 2009/0323624 A1 | 12/2009 | Kim | |
| 2010/0014430 A1 | 1/2010 | Oka | |
| 2010/0034095 A1 | 2/2010 | Ho et al. | |
| 2010/0062795 A1 | 3/2010 | Lee | |
| 2010/0105334 A1 | 4/2010 | Terry et al. | |
| 2010/0226263 A1 | 9/2010 | Chun et al. | |
| 2010/0232335 A1 | 9/2010 | Lee et al. | |
| 2010/0290400 A1 | 11/2010 | Lee et al. | |
| 2011/0038376 A1 | 2/2011 | Wiemann et al. | |
| 2011/0093754 A1 | 4/2011 | Chun et al. | |

FOREIGN PATENT DOCUMENTS

| | | |
|---|---|---|
| CN | 1430359 | 7/2003 |
| CN | 1565140 | 1/2005 |
| CN | 1649285 | 8/2005 |
| CN | 1656840 | 8/2005 |
| CN | 1663158 | 8/2005 |
| CN | 1692661 | 11/2005 |
| DE | 10305358 | 7/2004 |
| DE | 10337828 | 4/2005 |
| EP | 0978958 | 2/2000 |
| EP | 1009184 | 6/2000 |
| EP | 1041850 | 10/2000 |
| EP | 1213939 | 6/2002 |
| EP | 1261222 | 11/2002 |
| EP | 1315342 | 5/2003 |
| EP | 1361514 | 11/2003 |
| EP | 1392074 | 2/2004 |
| EP | 1441473 | 7/2004 |
| EP | 1478203 | 11/2004 |
| EP | 1557968 | 7/2005 |
| EP | 1599063 | 11/2005 |
| EP | 1496639 | 12/2005 |
| EP | 1605724 | 12/2005 |
| EP | 1684538 | 7/2006 |
| JP | 6-013959 | 1/1994 |
| JP | 06-121001 | 4/1994 |
| JP | 9-055693 | 2/1997 |
| JP | 9-327072 | 12/1997 |
| JP | 11-308671 | 11/1999 |
| JP | 11-331949 | 11/1999 |
| JP | 2000-032088 | 1/2000 |
| JP | 2000-151494 | 5/2000 |
| JP | 2000-175271 | 6/2000 |
| JP | 2000-184428 | 6/2000 |
| JP | 2001-95031 | 4/2001 |
| JP | 2001-298770 | 10/2001 |
| JP | 2002064589 | 2/2002 |
| JP | 2002-135231 | 5/2002 |
| JP | 2002-374321 | 12/2002 |
| JP | 2002374321 | 12/2002 |
| JP | 2003-008635 | 1/2003 |
| JP | 2003008635 | 1/2003 |
| JP | 2003078480 | 3/2003 |
| JP | 2003-116172 | 4/2003 |
| JP | 2003174470 | 6/2003 |
| JP | 2004-128967 | 4/2004 |
| JP | 2004128967 | 4/2004 |
| JP | 2004-320165 | 11/2004 |
| JP | 2004312771 | 11/2004 |
| JP | 2004-349884 | 12/2004 |
| JP | 2005-517369 | 6/2005 |
| JP | 2005217743 | 8/2005 |
| JP | 2005525066 | 8/2005 |
| JP | 2005-236988 | 9/2005 |
| JP | 2005-237013 | 9/2005 |
| JP | 2005-244958 | 9/2005 |
| JP | 2005-536168 | 11/2005 |
| JP | 2005-539462 | 12/2005 |
| JP | 2005539462 | 12/2005 |
| JP | 2006-14372 | 1/2006 |
| JP | 2006-020044 | 1/2006 |
| JP | 2006-505998 | 2/2006 |
| JP | 2006352705 | 12/2006 |
| JP | 2009-284532 | 12/2009 |
| KR | 10-2001-0111634 | 12/2001 |
| KR | 10-2001-0111637 | 12/2001 |
| KR | 10-2004-0048675 | 6/2004 |
| KR | 10-2004-0064867 | 7/2004 |
| KR | 10-2004-0089937 | 10/2004 |
| KR | 1020050029395 | 3/2005 |
| KR | 10-2005-0110533 | 11/2005 |
| RU | 2168278 | 5/2001 |
| RU | 2191479 | 10/2002 |
| RU | 2232469 | 7/2004 |
| RU | 2237380 | 9/2004 |
| RU | 2232477 | 10/2004 |
| RU | 2270526 | 2/2006 |
| RU | 2009106289 | 8/2010 |
| TW | 407407 | 10/2000 |
| TW | 548916 | 8/2003 |
| TW | 552815 | 9/2003 |
| TW | 586283 | 5/2004 |
| TW | 589818 | 6/2004 |
| TW | 590340 | 6/2004 |
| TW | 592412 | 6/2004 |
| TW | 200522579 | 7/2005 |
| TW | I237478 | 8/2005 |
| TW | I239731 | 9/2005 |
| TW | I239756 | 9/2005 |
| TW | 200536318 | 11/2005 |
| TW | I242951 | 11/2005 |
| TW | 200605549 | 2/2006 |
| TW | I253824 | 4/2006 |
| WO | 94/09597 | 4/1994 |
| WO | 98/49857 | 11/1998 |
| WO | 99/44383 | 9/1999 |
| WO | 9960729 | 11/1999 |
| WO | WO99/63713 | 12/1999 |
| WO | 01/05068 | 1/2001 |
| WO | 01/35586 | 5/2001 |
| WO | 01/35692 | 5/2001 |
| WO | 01/86888 | 11/2001 |

(56) References Cited

FOREIGN PATENT DOCUMENTS

| WO | 02/03720 | 1/2002 |
|---|---|---|
| WO | 02/43403 | 5/2002 |
| WO | WO02/39760 | 5/2002 |
| WO | WO02/047417 | 6/2002 |
| WO | 02-075442 | 9/2002 |
| WO | 02-102110 | 12/2002 |
| WO | WO03/007636 | 1/2003 |
| WO | 03/017691 | 2/2003 |
| WO | 03043259 | 5/2003 |
| WO | 03443259 | 5/2003 |
| WO | 03/047155 | 6/2003 |
| WO | 03/055142 | 7/2003 |
| WO | WO03/056723 | 7/2003 |
| WO | 03/096571 | 11/2003 |
| WO | 2004/030393 | 4/2004 |
| WO | 2004030393 | 4/2004 |
| WO | WO2004/034656 | 4/2004 |
| WO | 2004045234 | 5/2004 |
| WO | 2004/075442 | 9/2004 |
| WO | 2004-089030 | 10/2004 |
| WO | 2005/018269 | 2/2005 |
| WO | 2005/036917 | 4/2005 |
| WO | 2005055472 | 6/2005 |
| WO | 2005/071887 | 8/2005 |
| WO | 2005074312 | 8/2005 |
| WO | 2005088886 | 9/2005 |
| WO | 2005-099125 | 10/2005 |
| WO | 2005/109695 | 11/2005 |
| WO | 2005/109837 | 11/2005 |
| WO | 2005-125125 | 12/2005 |
| WO | 2006/012946 | 2/2006 |
| WO | 2006/033552 | 3/2006 |

OTHER PUBLICATIONS

Zdarsky, F.A., et al.,"Handover in Mobile Communication Networks: Who Is in Control Anyway?", Proceedings of the 30th Annual EUROMICRO Conference, Aug. 31, 2004, XP10723593.
Lee, Y.D., "Method for Transmitting Response Information in Mobile Communications System," U.S. Appl. No. 12/903,109, Oct. 12, 2010.
Lee, Y.D., "Method for Transmitting Response Information in Mobile Communications System," U.S. Appl. No. 12/903,127, Oct. 12, 2010.
Ericsson: "E-UTRA Random Access", 3GPP TSG-RAN WG1, R1-051445 [online], Nov. 7, 2005, XP003020958.
LG Electronics, Inc.: "Framing in the MAC Entity", 3GPP TSG-RAN WG2, R2-061012 [on-line], Mar. 27, 2006; Retrieved from the Internet.
LG Electronics, Inc.: "HARQ and ARQ Operation", 3GPP TSG-RAN WG2, R2-060106 Jan. 9, 2006; Retrieved from the internet.
Motorola: "Paging Channel Design for E-UTRA", 3GPP TSG-RAN WG1,R1-061712 [online] Jun. 27, 2006.
Sarka, S. et al.: Common-Channel Soft Handoff in cdma2000—The Paging Channel. IEEE Transactions on Microwave Theory and Techniques. Jun. 2000.
NTT Docomo, et al.: "Paging Channel Structure for E-UTRA Downlink", 3GPP TSG-RAN WG1, R1-060034 [online], Jan. 23, 2006.
Derryberry, R.T. et al., "Reverse high-speed packet data physical layer enhancements in cdma2000 1xEV-DV", Communications Magazine, IEEE, Apr. 2005.
Chung, J. et al., "Packet synchronization and identification for incremental redundancy transmission in FH-CDMA systems", Personal, Indoor and Mobile Radio Communications, 1992. Proceedings, PIMRC '92, Third IEEE International Symposium, Oct. 1992.
Chun, S.D., et al., "Data Transmission Method and Data Re-transmission Method," U.S. Appl. No. 12/961,451, Dec. 6, 2010.
Xu, H., et al.; "Performance Analysis on the Radio Link Control Protocol of UMTS System"; 2002 IEEE 56th Vehicular Technology Conference Proceedings; pp. 2026-2030; Sep. 2002.
Philips; "Evolved Paging Indicators for LTE"; 3GPP TSG-RAN WG2 Meeting #49; Doc. No. R2-052985; Nov. 7, 2005.
Huawei "Further considerations on multiplexing method of shared Control Channel in Uplink Single-Carrier FDMA" TSG-RAN WG1 #43, Nov. 7-11, 2005.
Fujitsu, et al. "Multiplexing method of shared control channel in uplink single-carrier FDMA radio access" TSG-RAN WG1 #42bis, Oct. 10-14, 2005.
Huawei; "Further considerations on multiplexing method of shared Control Channel in Uplink Single-Carrier FDMA"; TSG-RAN WG1 #43; R1-051430; Nov. 7, 2005.
NTT DoCoMo, et al.; "Multiplexing method of shared control channel in uplink single-carrier FDMA radio access", TSG-RAN WG1 #42bis; R1-051143; Oct. 10, 2005.
Park, S.J., "Allocating Radio Resources in Mobile Communications System," U.S. Appl. No. 12/160,100, Mar. 7, 2008.
LG Electronics, Inc., "UE State transition in LTE_ACTIVE," 3GPP TSG-RAN WG2 #52, R2-061002, Mar. 2006, XP-050130928.
Ericsson, "LTE States in E-UTRAN," 3GPP TSG-RAN WG2 Meeting #48bis, R2-052425, Oct. 2005, XP-050129534.
3GPP, "LTE; Evolved Universal Terrestrial Radio Access (E-UTRA); Medium Access Control (MAC) protocol specification (3GPP TS 36.321 version 8.4.0 Release 8)," ETSI TS 136 321, Jan. 2009.
Ericsson, "Solution for Sending NAS Together with RRC Connection Request," R2-071817, 3GPP TSG-RAN WG2#58, May 2007.
LG Electronics Inc., "Default SRB for initial access," R2-061958, 3GPP TSG-RAN WG2 LTE Ad-hoc, Jun. 2006.
3rd Generation Partnership Project (3GPP), "Universal Mobile Telecommunications System (UMTS); Radio Resource Control (RRC) protocol specification (3GPP TS 25.331 version 6.8.0 Release 6)," Dec. 2005.
3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346 V6.7.0, Dec. 2005.
IPWireless, "Layer 2 functions for LTE", R2-052377, 3GPP TSG RAN WG2 #48bis, Oct. 2005, XP-050129489.
LG Electronics Inc., "MAC Architecture of LTE", R2-060105, 3GPP TSG-RAN WG2 #50, Jan. 2006, XP-050130258.
LG Electronics Inc., "Discussion on RLC PDU Structure", R2-070721, 3GPP TSG-RAN WG2 #57, Feb. 2007, XP-050133754.
LG Electronics Inc., "HARQ and ARQ Operation", R2-060563, 3GPP TSG-RAN WG2 #51, Feb. 2006, XP-050130522.
European Patent Office Application Serial No. 07700843.1, Search Report dated Nov. 28, 2013, 8 pages.
China Mobile, "RRC States Analysis In LTE," 3GPP TSG RAN WG2#48, R2-052140, Aug. 29, 2005.
Panasonic, "E-UTRA Transport and Logical Channels," 3GPP TSG RAN WG2#49, R2-052860, Nov. 7, 2005.
Siemens, "States in E-UTRAN," 3GPP TSG-RAN WG RAN2#48, R2-052501, Aug. 29, 2005.
Qualcomm Europe, "Signaling Optimization for E-UTRAN," 3GPP TSG-RAN WG2 Meeting #48-bis, R2-052407, Oct. 10, 2005.

\* cited by examiner

METHOD FOR SCHEDULING RADIO RESOURCES IN MOBILE COMMUNICATION SYSTEM

CROSS-REFERENCE TO RELATED APPLICATIONS

This application is a 371 U.S. national stage application of International Application No. PCT/KR2007/000051, filed Jan. 4, 2007, which claims the benefit of earlier filing date and right of priority to Korean Patent Application No. 10-2006-0107104, filed Nov. 1, 2006, and U.S. Provisional Patent Application Nos. 60/757,063, filed Jan. 5, 2006, and 60/815,722, filed Jun. 21, 2006.

TECHNICAL FIELD

The present invention is directed to a mobile communication system, and, specifically, to a method for scheduling radio resources in a mobile communication system.

BACKGROUND ART

FIG. 1 is a structural diagram illustrating a Long Term Evolution (LTE) system which is a mobile communication system. The LTE system is an evolved version of a conventional UMTS system and has been standardized by the 3GPP (3rd Generation Partnership Project).

The LTE network may be generally classified into an Evolved UMTS Terrestrial Radio Access Network (E-UTRAN) and a Core Network (CN). The E-UTRAN includes at least one eNode-B serving as a base station and an Access Gateway (AG) located at the end of the network so that it is connected to an external network.

The AG may be classified into a portion that handles user traffic and a portion that handles control traffic. A first AG that handles user traffic may communicate with a second AG that handles control traffic via a new interface. A single eNode-B may include at least one cell.

A first interface for transmitting user traffic or a second interface for transmitting control traffic may be located between several eNode-Bs. The CN includes the AG and a plurality of nodes for registering users of User Equipment (UEs). If required, another interface for discriminating between the E-UTRAN and the CN may also be used for the LTE network.

FIG. 2 is a conceptual diagram illustrating a control plane of a radio interface protocol structure between the UE and the UTRAN (UMTS Terrestrial Radio Access Network) based on the 3GPP radio access network standard. The radio interface protocol horizontally includes a physical layer, a data link layer and a network layer. The radio interface protocol vertically includes a User Plane for transmitting data and a Control Plane for transmitting a control signaling.

The protocol layers shown in FIG. 2 may be classified into the first layer (L1), the second layer (L2), and the third layer (L3) on the basis of three lower layers of an Open System Interconnection (OSI) reference model that is well known in the art.

The physical layer which is as the first layer (L1) provides an Information Transfer Service over a physical channel. A radio resource control (RRC) layer located at the third layer (L3) controls radio resources between the UE and the network.

The RRC layer exchanges RRC messages between the UE and the network for this purpose. The RRC layer may be distributed to a plurality of network nodes, such as eNode-B and AG and may also be located at the eNode-B or the AG.

A radio protocol control plane will be described with reference to FIG. 2. The radio protocol control plane includes a physical layer, a Medium Access Control (MAC) layer, a Radio Link Control (RLC) layer and a Radio Resource Control (RRC) layer.

The physical layer transmits an Information Transfer Service to an upper layer over a physical channel while acting as the first layer (L1). The physical layer is connected to a Medium Access Control (MAC) layer located thereabove via a transport channel.

The MAC layer communicates with the physical layer over the transport channel such that data is transferred between the MAC layer and the physical layer. Data is transferred between respectively different physical layers, such as between a first physical layer of a transmitting side and a second physical layer of a receiving side.

The MAC layer of the second layer (L2) provides services to the RLC (Radio Link Control) layer, located thereabove via a logical channel. The RLC layer of the second layer (L2) supports transmission of data with reliability It should be noted that the RLC layer is depicted in dotted lines, because if the RLC functions are implemented in and performed by the MAC layer, the RLC layer itself may not need to exist.

The RRC (Radio Resource Control) layer located at the lowermost part of the third layer (L3) is only defined in the control plane. The RRC layer handles the control of logical channels, transport channels and physical channels in relation to configuration, reconfiguration and release of Radio Bearers (RBs). An RB refers to a service that is provided by the second layer (L2) for data transfer between the UE and the E-UTRAN.

FIG. 3 is a conceptual diagram illustrating a User Plane of a radio interface protocol structure between the UE and the UTRAN according to the 3GPP radio access network standard. The radio protocol user plane includes the physical layer, the MAC layer, the RLC layer and the PDCP layer.

The physical layer of the first layer (L1) and the MAC and RLC layers of the second layer (L2) are the same as those illustrated in FIG. 2. A PDCP layer of the second layer (L2) performs header compression to reduce the size of a relatively-large IP packet header containing unnecessary control information in order to effectively transmit IP packets, such as IPv4 or IPv6, within a radio-communication period having a narrow bandwidth.

Uplink and downlink channels for transmitting data between the network and the UE will hereinafter be described in detail. Downlink channels transmit data from the network to the UE. Uplink channels transmit data from the UE to the network.

Examples of downlink channels are a Broadcast Channel (BCH) for transmitting system information and a downlink Shared Channel (SCH) and a Shared Control Channel (SCCH) for transmitting user traffic or control messages. The user traffic or control messages of a downlink multicast service or broadcast service may be transmitted over the downlink shared channel (SCH) or may be transmitted over an additional multicast channel (MCH).

Examples of uplink channels are a Random Access Channel (RACH) and an uplink shared channel (SCH) and a shared control channel (SCCH) for transmitting user traffic or control messages.

An orthogonal frequency division multiplexing (OFDM) scheme for use in the physical layer which is the first layer will hereinafter be described in detail. The OFDM scheme divides a high-speed data stream into several low-speed data streams and simultaneously transmits the low-speed data streams over a plurality of carriers. Here, each of the plurality of carriers is a subcarrier.

The OFDM scheme has orthogonality between several subcarriers. Therefore, the frequency components of the subcarriers can be detected at the receiving side although frequency components of the subcarriers overlap each other.

The high-rate data stream is converted into several low-speed data streams by a serial/parallel converter, which is also called a "serial to parallel converter." Each of the subcarriers is multiplied by the parallel data streams generated by the serial/parallel converter and the resultant data streams are summed such that the sum of the data streams is transmitted to the receiving side.

The parallel data streams generated by the serial/parallel converter may be transmitted to a destination over a plurality of subcarriers according to an Inverse Discrete Fourier Transform (IDFT) scheme. The IDFT may be effectively implemented by an Inverse Fast Fourier Transform (IFFT) scheme.

Temporal signal dispersion generated by the multi-path delay spreading, such as relative signal dispersion in time, decreases as symbol duration of the low-speed subcarrier increases. A guard interval longer than a channel delay dispersion interval is inserted between OFDM symbols such that inter-symbol interference may be reduced. If the OFDM symbols can be cyclically extended, a duplicate of some parts of the OFDM signal is arranged at the guard interval, thereby resulting in the protection of the symbols.

A conventional Orthogonal Frequency Division Multiple Access (OFDMA) scheme will hereinafter be described in detail. The OFDMA scheme transmits some pails of subcarriers available for a system based on OFDM modulation to individual users such that a multiple access function may be implemented for the users.

The OFDMA scheme transmits frequency resources called subcarriers to the users. The frequency resources are transmitted to the users independent of each other such that they do not overlap each other. As a result, the frequency resources are exclusively allocated to the users such that there is no overlapping.

FIG. 4 is a block diagram illustrating a transmitter based on a Discrete Fourier Transform Single-Orthogonal Frequency Division Multiple (DFT-S-OFDM) scheme, hereinafter referred to as a "DFT-S-OFDM transmitter." A conventional DFT-S-OFDM scheme will be described with reference to FIG. 4.

For the convenience of description, a plurality of variables will be defined. Variable "N" is indicative of the number of subcarriers over which OFDM signals are transmitted. Variable "Nb" is indicative of the number of subcarriers for a specific user. Variable "F" is indicative of a Discrete Fourier Transform (DFT) matrix. Variable "s" is indicative of a data-symbol vector. Variable "x" is indicative of a vector generated by data dispersion within a frequency domain. Variable "y" is indicative of an OFDM-symbol vector.

A Single Carrie-Frequency Division Multiple Access (SC-FDMA) system converts the data symbol(s) into a parallel signal using the serial/parallel converter 410 and performs dispersion of the data symbol(s) using a DFT matrix prior to the transmission of the data symbol(s) by the DFT dispersion module 420 the data symbols. Dispersion of is represented by Equation 1:

$$x = F_{Nb \times Nb} s \qquad \text{[Equation 1]}$$

With reference to Equation 1, $F_{Nb \times Nb}$ indicates an Nb-sized DFT matrix used for dispersion of the data symbol(s). The subcarrier mapping unit 430 performs subcarrier mapping of the dispersed vector (x) using a specific subcarrier allocation technique.

The IFDT module 440 receives the mapped signal from the subcarrier mapping unit 430 and converts the received signal into a time-domain signal to generate a target signal that is received at the receiving side via the parallel/serial converter 450. The target signal transmitted to the receiving side can be represented by Equation 2:

$$y = F_{N \times N}^{-1} x \qquad \text{[Equation 2]}$$

With reference to Equation 2, $F_{N \times N}^{-1}$ indicates an N-sized IDFT matrix required for converting a frequency-domain signal to a time-domain signal. The cyclic prefix insertion unit 460 inserts a cyclic prefix into the OFDM-symbol vector (y) such that the resultant "y" signal including the cyclic prefix is transmitted to a destination.

A method for generating a transmission signal and transmitting the signal to the receiving side according to the above-mentioned scheme is referred to as an SC-FDMA method. The size of the DFT matrix can be controlled in various ways to implement a specific object.

FIG. 5 is a conceptual diagram illustrating a hybrid ARQ (HARQ) scheme. A method for implementing HARQ in the downlink physical layer of a radio packet communication system will be described with reference to FIG. 5.

Referring to FIG. 5, the eNode-B determines a UE that is to receive packets and information of the type of packet that is to be transmitted to the UE, such as a code rate, a modulation scheme and an amount of data. The eNode-B informs the UE of the determined information over an HS-SCCH (High-Speed Downlink Shared Control Channel) and transmits a corresponding data packet (HS-DSCH) at a time associated with the transmission of the information over the HS-SCCH.

The UE receives information of the packet over the HS-SCCH. The UE then recognizes the type and transmission point of the packet and receives the corresponding packet.

The UE transmits a negative acknowledgement (NACK) signal to the eNode-B if the UE fails to decode a specific packet, such as data1. The eNode-B recognizes that packet transmission has failed and re-transmits the same data, such as data1, using the same packet format or a new packet format at a suitable time point. The UE combines the re-transmitted packet, such as data1, and a previously-received packet for which packet decoding failed and re-attempts packet decoding.

The UE transmits an acknowledgement (ACK) signal to the eNode-B if the packet is received and decoded successfully. The eNode-B recognizes successful packet transmission and performs transmission of the next packet, such as data2.

Some parts of the radio resources are allocated according to scheduling of the upper layer in order to allow a plurality of eNode-Bs to communicate with a plurality of UEs over limited radio resources using a mobile communication system. The scheduling is generally executed by the eNode-B(s), which communicate with the UEs using the allocated radio resources.

The eNode-B allocates radio resources to the UE upon receiving a request from the UE. The eNode-B may also allocate the radio resources to the UE if there is a need to allocate radio resources to the UE in the absence of a request from the UE. The radio resources are also allocated to the UE if there is a need to pre-allocate the radio resources to the UE.

The UEs transmit data or control signals using prescribed radio resources allocated by the eNode-B. The radio resources allocated by the eNode-B in an uplink transmission are prescribed for specific UEs.

Therefore, the radio resources may be unnecessarily wasted if the specific UEs do not use the radio resources allocated by the eNode-B. In other words, it is difficult to re-allocate radio resources that were pre-allocated to specific UEs to other UEs, thereby resulting in ineffective use of radio resources.

DISCLOSURE OF INVENTION

Accordingly, the present invention is directed to a method for scheduling radio resources of a mobile communication system that substantially obviates one or more problems due to limitations and disadvantages of the related art. An object of the present invention is to provide a radio-resource scheduling method for improving efficiency of radio resources available for a mobile communication system, thereby facilitating more efficient communication between the UE and an eNode-B. Another object of the present invention is to provide a radio-resource scheduling method for reducing an amount of wasted radio resources. Still another object of the present invention is to provide a radio-resource scheduling method for effectively allocating radio resources using a message received from a UE during an uplink transmission by the UE.

In one aspect of the present invention, a method for scheduling radio resources in a mobile communication system is provided. The method includes receiving an indication of allocated radio resources, transmitting information using the allocated radio resources, either transmitting an indication that the radio resources are no longer needed or receiving an indication that the radio resources are no longer allocated and no longer transmitting information using the radio resources.

It is contemplated that the method further includes receiving an indication that the resources are no longer allocated after transmitting the indication that radio resources are no longer needed. It is further contemplated that the indication that the resources are no longer allocated includes a message between a second protocol layer and a first protocol layer.

It is contemplated that transmitting the indication that the radio resources are no longer needed includes transmitting either an uplink control signal or a preamble over a random access channel (RACH). It is further contemplated that the indication that the radio resources are no longer needed includes an indication that there is no data left for transmission over an uplink path.

In another aspect of the present invention, a method for scheduling radio resources in a mobile communication system is provided. The method includes allocating radio resources to a first mobile communication terminal, determining that the allocated radio resources are no longer needed and re-allocating the radio resources to a second mobile communication terminal.

It is contemplated that determining that the allocated radio resources are no longer needed includes receiving an indication that the radio resources are no longer needed. It is further contemplated that receiving the indication that the radio resources are no longer needed includes receiving either an uplink control signal or a preamble over a random access channel (RACH).

It is contemplated that the indication that the radio resources are no longer needed includes an indication that there is no data left for transmission over an uplink path. It is farther contemplated that determining that the allocated radio resources are no longer needed includes determining that the first mobile communication terminal has no additional information to transmit It is contemplated that the method farther includes transmitting an indication to the first mobile communication terminal that the resources are no longer allocated. It is further contemplated that the indication that the resources are no longer allocated includes a message between a second protocol layer and a first protocol layer.

In another aspect of the present invention, a method for scheduling radio resources in a mobile communication system is provided. The method includes a network allocating radio resources to a first mobile communication terminal, the first mobile communication terminal transmitting information using the allocated radio resources, determining that the allocated radio resources are no longer needed, the network re-allocating the radio resources to a second mobile communication terminal and the first mobile communication terminal no longer transmitting information using the radio resources.

It is contemplated that determining that the allocated radio resources are no longer needed includes the first mobile communication terminal transmitting an indication that the radio resources are no longer needed. It is further contemplated that the first mobile communication terminal transmits the indication that the radio resources are no longer needed in either an uplink control signal or a preamble over a random access channel (RACH).

It is contemplated that the method further includes the network transmitting an indication to the first mobile communication terminal that the resources are no longer allocated. It is further contemplated that the indication that the resources are no longer allocated includes a message between a second protocol layer and a first protocol layer.

It is contemplated that determining that the allocated radio resources are no longer needed includes the network determining that the first mobile communication terminal has no additional information to transmit. It is further contemplated that the method further includes the network transmitting an indication to the first mobile communication terminal that the resources are no longer allocated. Preferably, the indication that the resources are no longer allocated includes a message between a second protocol layer and a first protocol layer.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. A method for scheduling radio resources of a mobile communication system according to the present invention will hereinafter be described with reference to the accompanying drawings.

For the convenience of description and better understanding of the present invention, "terminal" is used to refer to a transmitter of an uplink signal and "base station" is used as a receiver of the uplink signal. However, it should be noted that the scope of "terminal" and "base station" is not limited to the above-mentioned terms and "terminal" and "base station" may also be used to refer to, respectively, a UE and Node-B or eNode-B.

The following preferred embodiments of the present invention are implemented when the present invention is applied to an OFDM-based LTE system. The OFDM system allocates a single resource block (RB) composed of both a specific subframe and specific subcarrier when the eNode-B performs scheduling of uplink or downlink radio resources from the eNode-B to the UE. This is unlike a Code Division Multiple Access (CDMA) system. The UE or the eNode-B can perform transmission/reception of data using the allocated RBs.

Figure 6:
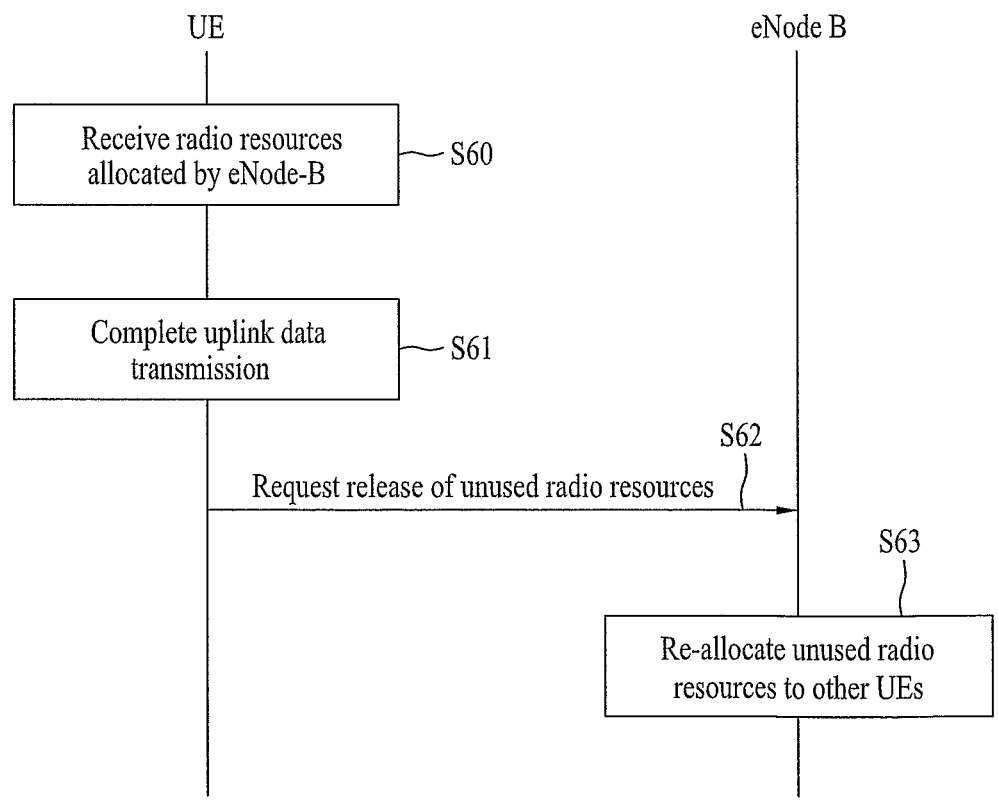
FIG. 6 is a flow chart illustrating a method for scheduling radio resources of a mobile communication system according to a one embodiment of the present invention.

FIG. 6 is a flow chart illustrating a method for scheduling radio resources of a mobile communication system according to one embodiment of the present invention. The scheduling of data transmission or reception may also be executed by entities other than the eNode-B as necessary. For convenience of description and better understanding of the present invention, it is assumed that the scheduling process is executed by only the eNode-B.

The eNode-B allocates radio resources for data communication to individual UEs connected to the eNode-B. As previously stated, the radio resources are indicative of RBs.

The radio resources may be allocated to the UEs upon receiving requests from the UEs. The eNode-B may also pre-allocate the radio resources to the UEs as necessary in the absence of requests from the UEs.

The UE radio resource request process is executed according to RACH, CQI, ACK/NACK and data types of a second layer. Each UE receives uplink radio resources allocated by the eNode-B (step S60).

Each UE completes uplink data transmission using the allocated radio resources in an uplink transmission path in which the UE is a transmitter (Step S61). Uplink radio resources may be left after the UE completes the data transmission using the radio resources.

For example, it is assumed that the eNode-B allocates 100 RBs as uplink radio resources of a specific UE. If the radio resources used for the uplink data transmission by the UE are only 80 RBs, 20 RBs may be left in the UE.

The specific UE transmits a message including a specific information to the eNode-B in order to inform the eNode-B of remaining radio resources (step S62) if there are remaining radio resources after the specific UE completes uplink data transmission. Preferably, the specific information is included in a "Request for de-allocation of the allocated uplink radio resource" message, hereinafter referred to as a "radio resource allocation release request message", for requesting the eNode-B to release the allocated radio resources.

Figure 1:
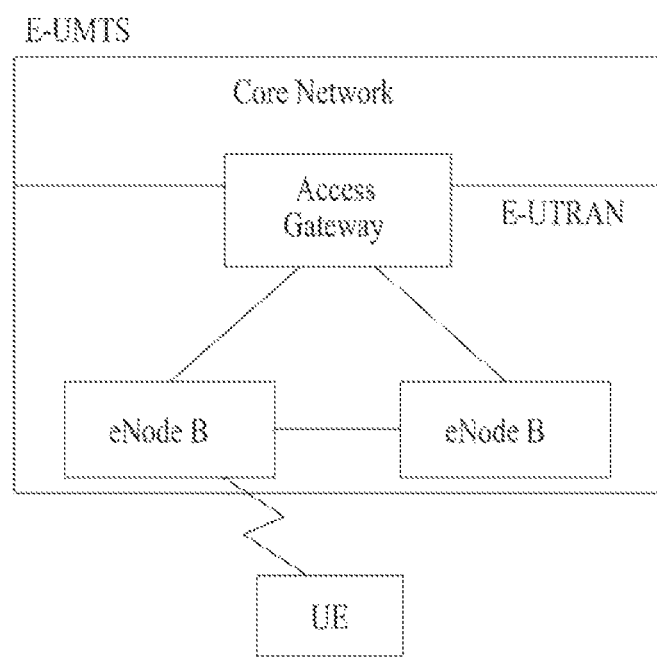
FIG. 1 is a structural diagram illustrating a conventional Long Term Evolution (LTE) system which is a mobile communication system.
Figure 2:
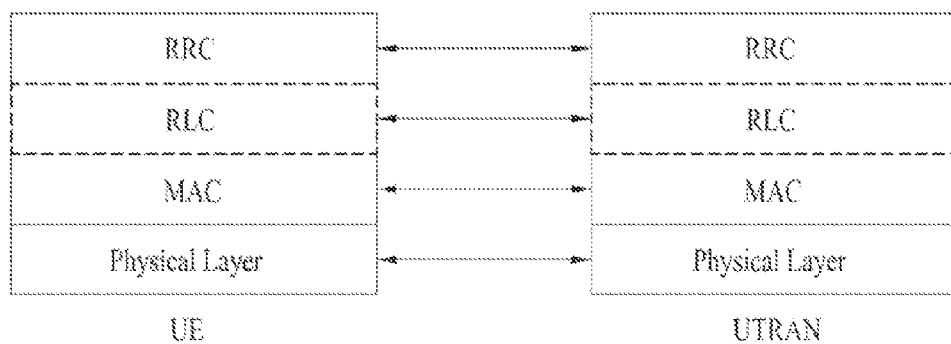
FIG. 2 is a conceptual diagram illustrating a Control Plane of a conventional radio interface protocol structure between a UE and a UTRAN based on a 3GPP radio access network standard.
Figure 3:
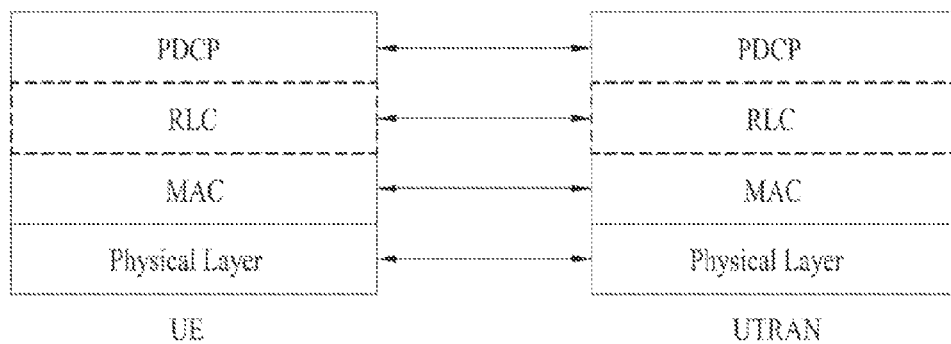
FIG. 3 is a conceptual diagram illustrating a User Plane of a conventional radio interface protocol structure between a UE and a UTRAN based on a 3GPP radio access network standard.
Figure 4:
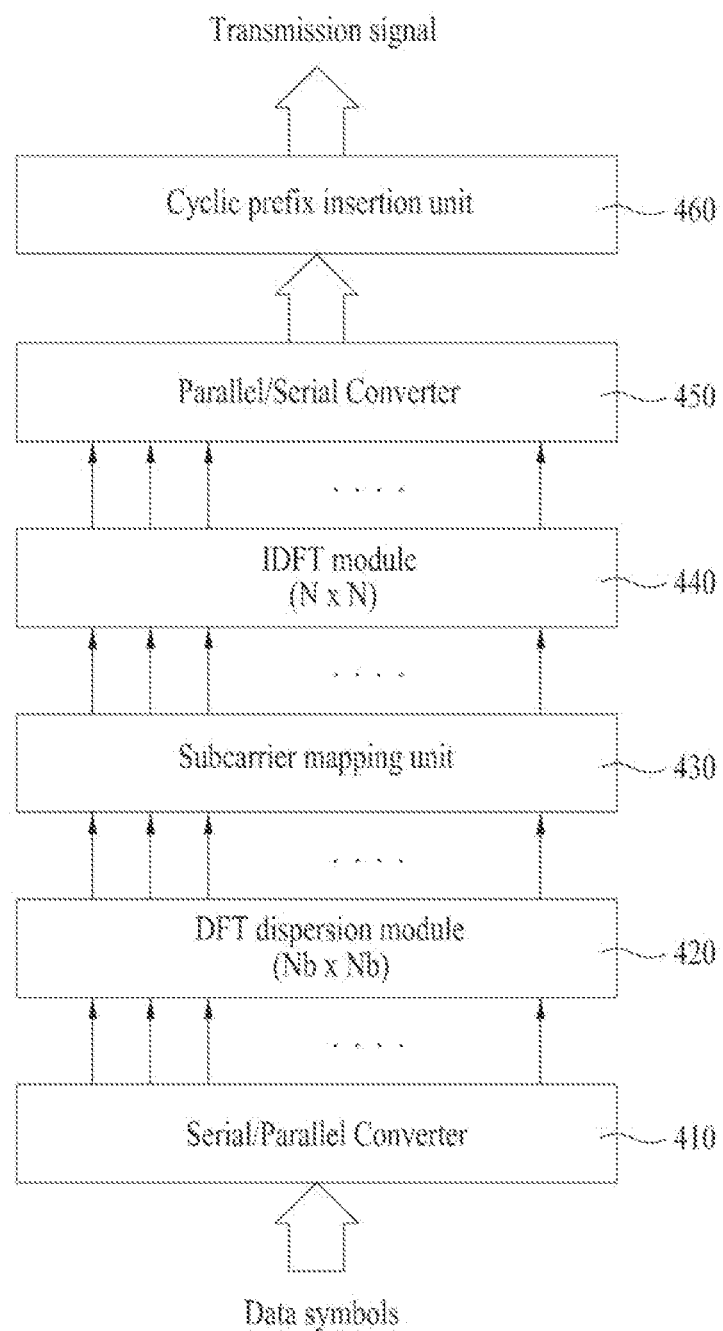
FIG. 4 is a block diagram illustrating a conventional transmitter based on a DFT-S-OFDM scheme.
Figure 5:
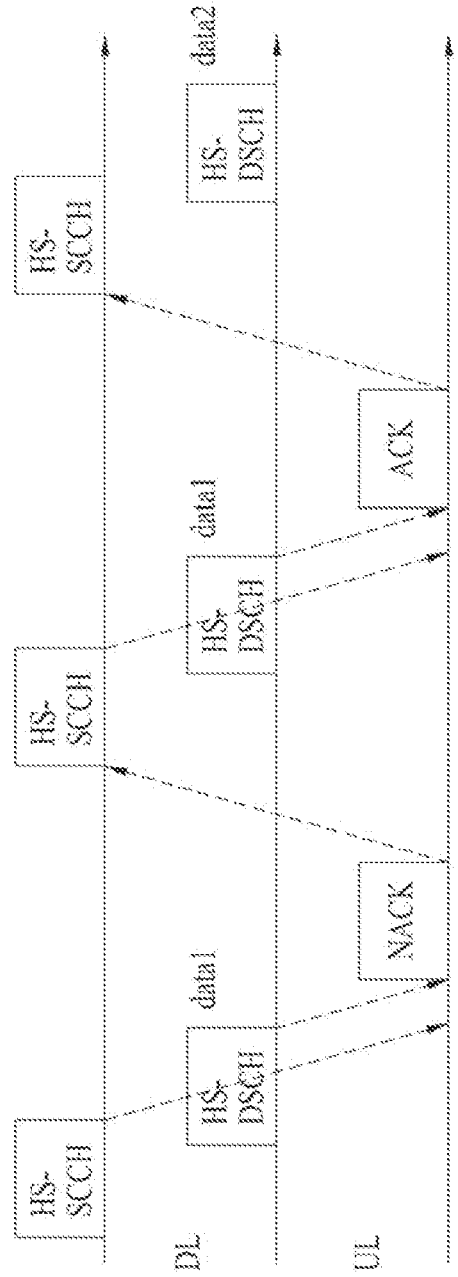
FIG. 5 is a conceptual diagram illustrating a conventional hybrid ARQ (HARQ) scheme.

The radio-resource allocation release request message may be transmitted to a destination according to data types of the second layer illustrated in FIG. 3 or may be transmitted to the destination over a specific physical channel. A representative example of a method for transmitting a message including information of the allocated radio resource according to the data types of the second layer will hereinafter be described in detail.

For example, the above-mentioned radio resource allocation release request message may be contained in a Protocol Data Unit (PDU) of the MAC layer (hereinafter referred to as a "MAC PDU") and transmitted to the eNode-B. The radio resource allocation release request message may employ a 1-bit indicator if the radio resource allocation release request message is contained in the MAC PDU such that the MAC PDU including the radio resource allocation release request message is transmitted to a destination.

The 1-bit indicator is set to "1" to indicate that data for transmission for an uplink remains in a buffer of the specific UE. The 1-bit indicator is set to "0" to indicate that there is no more data for transmission left in the buffer of the specific UE.

The eNode-B recognizes the completion of uplink data transmission of the specific UE if the 1-bit indicator set to "0" is received. Otherwise, the eNode-B recognizes that data remains to be transmitted for the uplink in the specific UE if the 1-bit indicator set to "1" is received.

In another example, the RACH which is a representative transport channel may be used for transmitting the radio resource allocation release request message. The RACH represents a channel for transmitting an initial control message from the UE to the network.

Generally, the RACH is adapted to synchronize between the UE and the network. Furthermore, the UE can acquire necessary radio resources using the RACH if there is no more data left for transmission in a UE that desires to transmit data in an uplink direction.

The specific UE transmits a radio resource allocation release request message to the eNode-B over the RACH. A specific indicator may be contained in a preamble of the RACH.

In another example, an uplink control signal may be used for transmitting the radio resource allocation release request message. The uplink control signal may also be transmitted to a destination along with other uplink control signals if required. There are a variety of uplink control signals, such as CQI and ACK/NACK.

The information of the release request is contained in the CQI or ACK/NACK signal such that the UE can inform the eNode-B of the completion of data transmission if the UE transmits the CQI or ACK/NACK signal. The UE may also transmit the information of the release request to the eNode-B using the 1-bit indicator.

In another example, a dedicated physical channel may be used for transmitting the radio resource allocation release request message. The eNode-B recognizes the presence of unused radio resources when it receives the radio resource allocation release request message. The eNode-B then re-allocates the unused radio resources, such as radio resources released by a specific UE, to other UEs (step S63).

The eNode-B may re-allocate the unused radio resources to the specific UE. The eNode-B may allocate the released radio resources to the UEs if it receives radio resource request messages from other UEs.

The eNode-B may allocate the released radio resources to the other UEs in the absence of a request from the other UEs, if required. The radio resource requests of the other UEs may be executed according to random access channel (RACH), CQI, ACK/NACK, and data types of the second layer.

Figure 7:
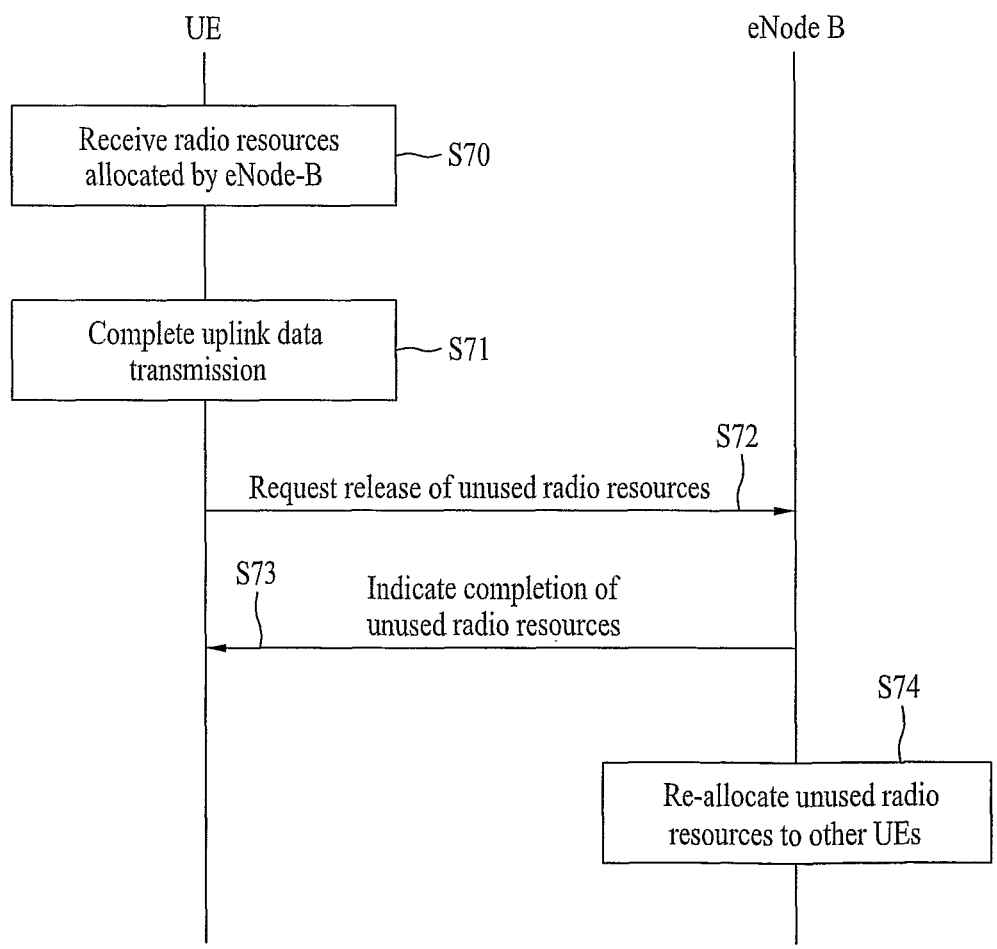
FIG. 7 is a flow chart illustrating a method for scheduling radio resources of a mobile communication system according to another embodiment of the present invention.

FIG. 7 is a flow chart illustrating a method for scheduling radio resources of a mobile communication system according to another embodiment of the present invention. As illustrate in FIG. 7, the process for controlling the eNode-B to allocate some radio resources to the specific UE and a process for controlling the specific UE to transmit/receive data at steps S70 and S71 are identical to steps S60 and S61 illustrated FIG. 6. Furthermore, the method for transmitting the radio resource allocation release request message at step S72 of FIG. 7 is identical to step S62 illustrated FIG. 6 if radio resources are left in the UE after uplink data transmission is completed.

The radio resource allocation release request message may be transmitted according to data types of the second layer, may be transmitted over the RACH, or may be transmitted at a transmission time of the control signals, such as CQI and ACK/NACK. The 1-bit indicator is used as the radio resource allocation release request message.

Setting the 1-bit indicator to "1" indicates that the buffer of the UE still has data to be transmitted. Setting the 1-bit indicator to "0" indicates that there is no more data for transmission left in the buffer of the UE. In this way, the UE can inform the eNode-B of information regarding the state of the buffer.

The eNode-B transmits a radio resource allocation release completion message to the specific UE (step S73) upon receiving the radio resource allocation release request message from a specific UE. The eNode-B can prevent the specific UE from re-using the radio resources if the eNode-B re-allocates the radio resources to other UEs after transmitting the radio resource allocation release completion message, thereby preventing a collision between the specific UE and the other UEs from being generated.

The radio-resource allocation release completion message may be transmitted via a control signal of the first or second layer. The radio-resource allocation release completion message may also be transmitted over a downlink shared channel (DL-SCH).

The eNode-B re-allocates released radio resources to other UEs when it receives the radio resource allocation release request message from the specific UE after transmitting the radio resource allocation release completion message. The radio resource allocation request messages may be received from other UEs such that the released radio resources can be allocated to the other UEs. The eNode-B may also allocate the released radio resources to the other UEs in the absence of radio resource allocation request messages from the other UEs.

The method for scheduling radio resources of a mobile communication system according to the present invention can re-allocate radio resources to other UEs using a message received from a specific UE such that wasted radio resources are minimized when allocated radio resources remain in the specific UE after it completes uplink data transmission. In this way, efficiency of data communication in a mobile communication system may be enhanced.

It will be apparent to those skilled in the art that various modifications and variations can be made in the present invention without departing from the spirit or scope of the inventions. Therefore, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

INDUSTRIAL APPLICABILITY

The present invention can be applied to a mobile communication system.

What is claimed is:

1. A method for scheduling radio resources in a base station in a mobile communication system, the method comprising:
   allocating a number of radio resources to a first user equipment upon receiving resource requests from the first user equipment or pre-allocating resources to the first user equipment in the absence of receiving requests from the first user equipment;
   transmitting information between the base station and the first user equipment using a portion of the number of allocated radio resources, wherein the portion of the number of allocated radio resources is less than the number of allocated radio resources;
   receiving, from the first user equipment, a first message including a bit set to 1 indicating that information for transmission remains in a buffer of the first user equipment and also indicating that another portion of the number of allocated radio resources were not used during the transmission of the information;

de-allocating, from the first user equipment, all of the radio resources of the another portion of the number of allocated radio resources that were not used during the transmission of the information;

transmitting, to the first user equipment, a second message indicating that all of the another portion of the number of allocated radio resources that were not used during the transmission of the information have been de-allocated from the first user equipment;

re-allocating the de-allocated radio resources to a second user equipment; and maintaining allocation, to the first user equipment, of the portion of the number of allocated radio resources that were used during the transmission of the information.

2. The method of claim 1, wherein the second indication is included in a message between a second protocol layer and a first protocol layer.

3. A method for scheduling radio resources in a user equipment in a mobile communication system, the method comprising:

receiving an indication of a number of allocated radio resources, from a base station, in response to requesting resources from the base station or the base station pre-allocating resources to the user equipment as necessary in the absence of requests from the user equipment;

transmitting information between the user equipment and the base station using a portion of the number of allocated radio resources, wherein the portion of the number of allocated radio resources is less than the number of allocated radio resources;

transmitting, to the base station, a first message including a bit set to 1 indicating that information for transmission remains in a buffer of the user equipment and also indicating that all of another portion of the number of allocated radio resources were not used during the transmission of the information;

receiving, from the base station, a second message indicating that all of the another portion of the number of allocated radio resources that were not used during the transmission of the information have been de-allocated from the user equipment;

maintaining allocation, in the user equipment, of the portion of the number of allocated radio resources that were used during the transmission of the information; and transmitting, to the base station, the information remaining in the buffer using the maintained portion of the number of allocated radio resources after receiving the indication that all of the another portion of the number of allocated radio resources that were not used during the transmission of the information have been de-allocated from the user equipment.

4. The method of claim 3, wherein the second indication is included in a message between a second protocol layer and a first protocol layer.

\* \* \* \* \*